No. 807,220. PATENTED DEC. 12, 1905.
A. TINDEL.
ROTARY CUTTING TOOL.
APPLICATION FILED OCT. 12, 1903.
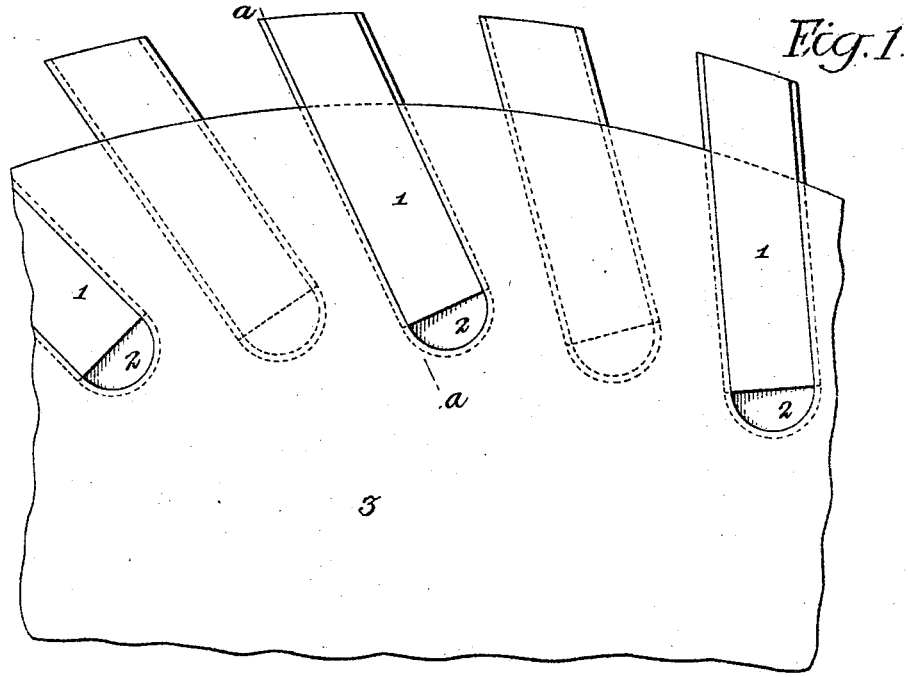
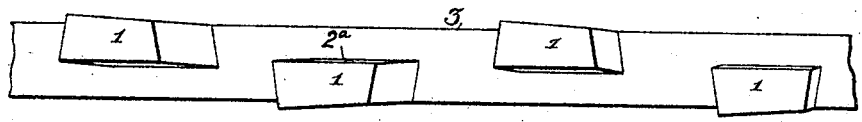
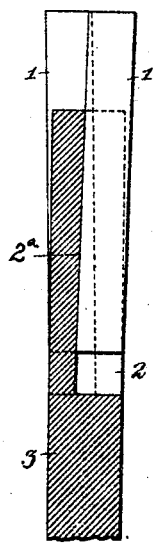
Witnesses
Hamilton D. Turner
Titus H. Irons
Inventor
Adam Tindel
by his attorneys

UNITED STATES PATENT OFFICE.

ADAM TINDEL, OF PHILADELPHIA, PENNSYLVANIA, ASSIGNOR TO THE HIGH DUTY SAW AND TOOL COMPANY, OF EDDYSTONE, PENNSYLVANIA, A CORPORATION OF PENNSYLVANIA.

ROTARY CUTTING-TOOL.

No. 807,220.   Specification of Letters Patent.   Patented Dec. 12, 1905.

Application filed October 12, 1903. Serial No. 176,729.

*To all whom it may concern:*

Be it known that I, ADAM TINDEL, a citizen of the United States, residing in Philadelphia, Pennsylvania, have invented certain Improvements in Rotary Cutting-Tools, of which the following is a specification.

My invention consists of certain improvements in the rotary cutting-tool for which I obtained Letters Patent of the United States, No. 729,517, dated May 26, 1903, the object of my present invention being to simplify the construction of said tool by rendering it unnecessary to set each tooth at an angle in respect to a line parallel with the face of the body and crossing the narrow dimension or width of the tooth-receiving groove or slot, the milling of the grooves or slots in the body for the reception of the teeth being therefore simplified to this extent.

In the accompanying drawings, Figure 1 is a side view of part of a saw-blade constructed in accordance with my present invention. Fig. 2 is an edge view of part of the same; and Fig. 3 is a vertical section on the line *a a*, Fig. 1.

As in the former tool, the cutting bits or teeth 1 have beveled front and rear edges, as shown in Fig. 2, and are inserted into correspondingly-formed slots or grooves 2 in the body 3, which grooves are formed in the right and left sides of the body alternately and are of such length that the teeth will project to the desired extent outwardly beyond the periphery of the body, as shown in Fig. 1.

Each of the grooves is inclined backwardly from the periphery of the body at an angle in respect to a radial line drawn from the center of the body to the periphery, so that the cutting edges of the teeth will have a good cutting angle and the resistance of the cut will have the effect of forcing the teeth into the grooves, and will thus prevent any loosening or drawing out of the teeth in the operation of cutting, thereby rendering unnecessary the use of any supplementary fastening or locking devices. The inner sides 2ª of the grooves 2 are also, as before, slightly inclined in a lateral direction from a plane parallel with the face of the body outwardly toward the periphery, as shown in Fig. 3, so as to impart a slight outward pitch or set to the teeth, whereby the cutting ends of the latter project laterally beyond the face of the body. In the patented tool the inner wall of each groove was also given a slight outward inclination toward the front edge thereof, being set at a slight angle in respect to a line parallel with the face of the body and crossing the narrow dimension or width of the groove, so that only the front portions or forward edges of the teeth would be in contact with the walls of the kerf in cutting in order to give the teeth the necessary side clearance rearward and prevent friction upon them. In my present tool I attain this result by tapering the teeth themselves, as shown in Fig. 2, on reference to which it will be observed that each tool is wider at the front or cutting edge than at the rear edge and that the base of each groove 2 is parallel with a line crossing the narrow dimension or width of the groove flush with the face of the cutter-body instead of being inclined in respect to said line, as before, the milling of the grooves in the face of said cutter-body being therefore simplified.

I have shown my invention as applied to a tool having a flat body similar to a saw; but it will be evident that the invention is equally applicable to the other forms of tool shown in my prior patent.

The tool can be used for cutting any material usually cut by means of a saw.

Having thus described my invention, I claim and desire to secure by Letters Patent—

A rotary cutter having undercut grooves and teeth set therein, said grooves being of less depth than the thickness of the cutter-body and having their bases or inner walls inclined in a lateral direction from a plane parallel with the face of the body outward toward the periphery, the teeth being thicker at the front edge than at the rear edge, whereby side clearance is obtained without the necessity of inclining the base of the grooves in respect to a plane parallel with the face of the cutter-body and crossing the grooves in the direction of their width or smaller dimensions, substantially as specified.

In testimony whereof I have signed my name to this specification in the presence of two subscribing witnesses.

ADAM TINDEL.

Witnesses:
  F. E. BECHTOLD,
  JOS. H. KLEIN.